United States Patent [19]
Osborn

[11] 3,994,184
[45] Nov. 30, 1976

[54] SIMPLIFIED STRAIGHT-LINE SHIFTING ASSEMBLY

[75] Inventor: Charles H. Osborn, Spring Lake, Mich.

[73] Assignee: JSJ Corporation, Grand Haven, Mich.

[22] Filed: Sept. 4, 1975

[21] Appl. No.: 610,102

Related U.S. Application Data

[63] Continuation-in-part of Ser. No. 579,510, May 21, 1975, abandoned.

[52] U.S. Cl. ............................... 74/473 R; 74/475; 74/477
[51] Int. Cl.² ........................ G05G 9/02; G05G 5/10
[58] Field of Search .................. 74/473 R, 475, 477

[56] References Cited
UNITED STATES PATENTS

| | | | |
|---|---|---|---|
| 691,968 | 1/1902 | Paine | 74/491 |
| 3,101,821 | 8/1963 | Henry | 192/.096 |

Primary Examiner—Allan D. Herrmann
Attorney, Agent, or Firm—Price, Heneveld, Huizenga & Cooper

[57] ABSTRACT

A simplified shifting assembly in which a shifting stick is moved in a straight line to control gear range and differential operation in the transfer case of a four wheel drive vehicle. A gear lever arm is shiftable between "high", "neutral" and "low" gear positions while a differential lever arm is shiftable from a first to a second position to lock the differential mechanisms of the transfer case. Special cam slots and cam follower members on the lever arms and on an actuating member movable with the shifting stick effect movement of the differential lever arm by disengaging from the gear lever arm and engaging the differential lever arm.

33 Claims, 11 Drawing Figures

SIMPLIFIED STRAIGHT-LINE SHIFTING ASSEMBLY

CROSS REFERENCE TO RELATED APPLICATION

This is a continuation in part of application Ser. No. 579,510, filed May 21, 1975 entitled SIMPLIFIED STRAIGHTLINE SHIFTING ASSEMBLY, now abandoned.

BACKGROUND OF THE INVENTION

In four wheel drive vehicles having "full time" four wheel drive such as recreational vehicles and the like, a transmission and a transfer case are provided for effecting connection between engine output to the front and rear wheels of the vehicle. Such vehicles are used both on-the-road and off-the-road. During on-the-road use, a differential drive must be provided so that slippage may occur between the front and rear axles to prevent excessive wear of tires and related problems. In off-the-road applications, it is desirable that the differential be locked such that the driving power is applied to both axles. The transfer case includes a pair of control elements shiftable into several positions. A first element is movable in one direction for high gear range drive and in a directly opposite direction to low gear range drive position. The other element is moved to provide the differential locking function. These elements are operated by a manually operated shifting stick. Ideally, the shifting stick is movable in a straight line to effect movement of the elements on the transfer case. Since movement of the control elements is separate and in one range in the opposite direction from movement of the differential locking function element, the manually operated shifting arrangement has been extremely complicated both from an operator's standpoint and also because of the expense involved in constructing such shifting mechanisms. Heretofore, of necessity, such shifter assemblies were complicated in construction and required a great many component parts.

In the prior art, various control mechanisms have been proposed. One such prior art mechanism is shown in commonly assigned U.S. Pat. No. 3,902,378 issued Sept. 2, 1975 entitled STRAIGHT-LINE SHIFTING ASSEMBLY. Systems of this type, are relatively complicated and expensive to manufacture.

SUMMARY OF THE INVENTION

The present invention relates to a straight-line shifting assembly for shifting the transfer case mechanisms in a full time four wheel drive vehicle. A single shifting stick is operable to selectively manipulate a pair of actuating shafts or levers on a transfer case mechanism by movement of the shifting stick through a straight line. The shift assembly includes a pair of lever arms, one of which is shiftable between "high", "neutral" and "low" gear range positions and the other which is shiftable between differential locked and unlocked or differential operative positions. When the first lever arm is moved to either high gear range position or in the opposite direction to low gear range position, the differential lock position maybe engaged by shifting the second lever arm. The direction of travel of the second lever to the differential lock position remains the same while the first lever must be reversed in direction to shift from high to low gear range position. In the present invention, special cam slots and cam follower members on the selector arm assembly operated by a shifting stick and on the shifting levers rotate the lever arms about an axis to move the levers and the transfer case elements into the various positions with a straight line motion of the shifting stick. The many objects, features, and advantages of this invention will become readily apparent to those skilled in the art from a consideration of the following description when taken in connection with the accompanying drawings.

DESCRIPTION OF THE FIRST EMBODIMENT

Figure 1:
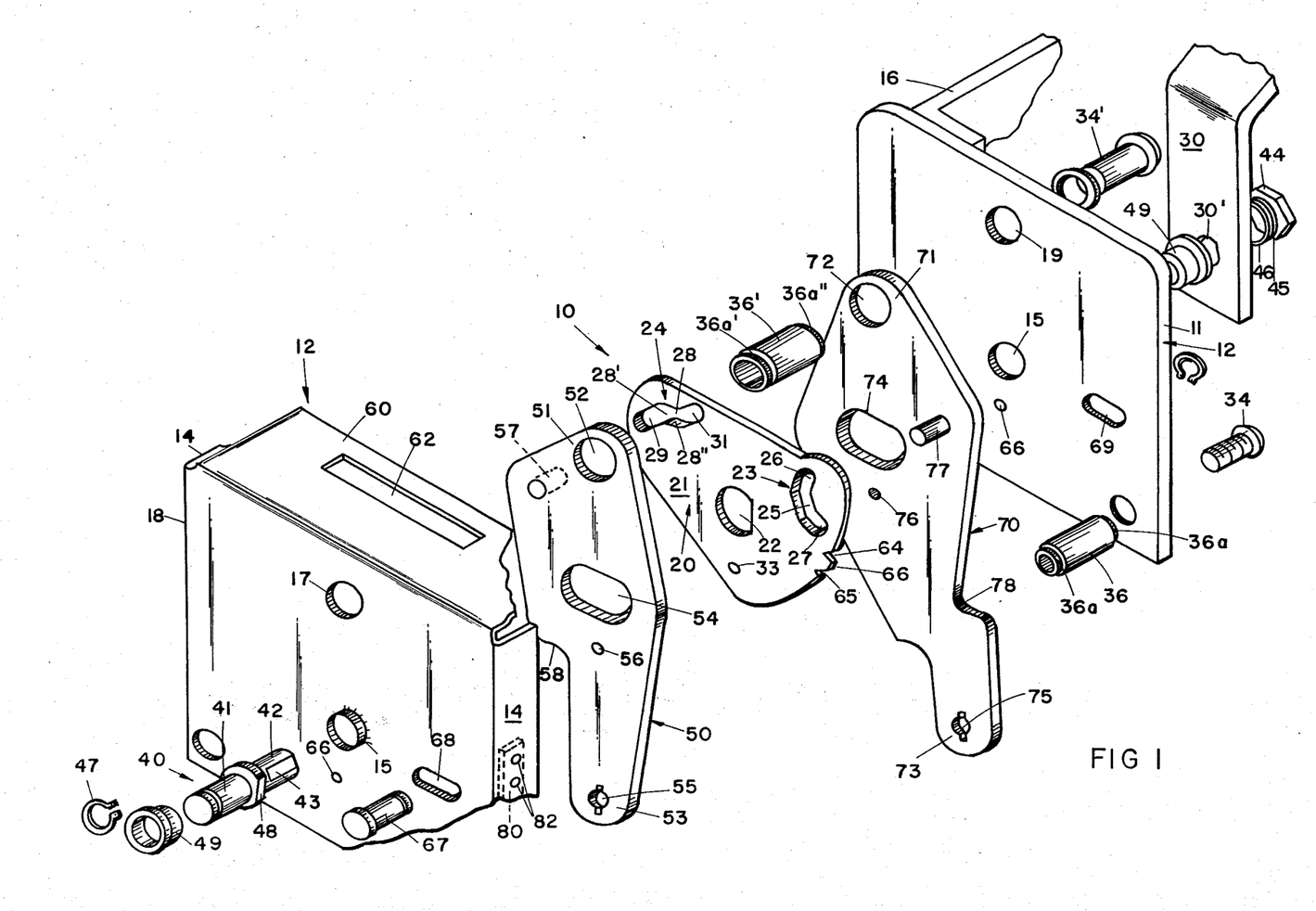
FIG. 1 is an exploded perspective view of a first embodiment of the simplified straight-line shifting assembly of the present invention.
Figure 2:
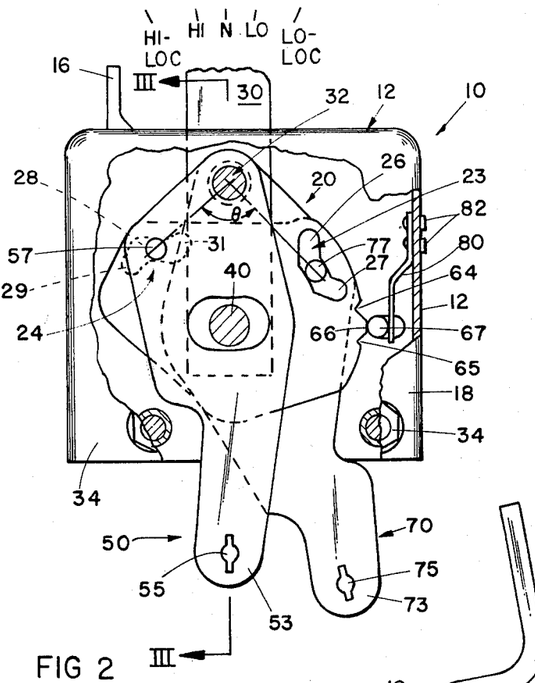
FIG. 2 is a plan view partially broken away illustrating the shifting mechanism in a neutral position.
Figure 3:
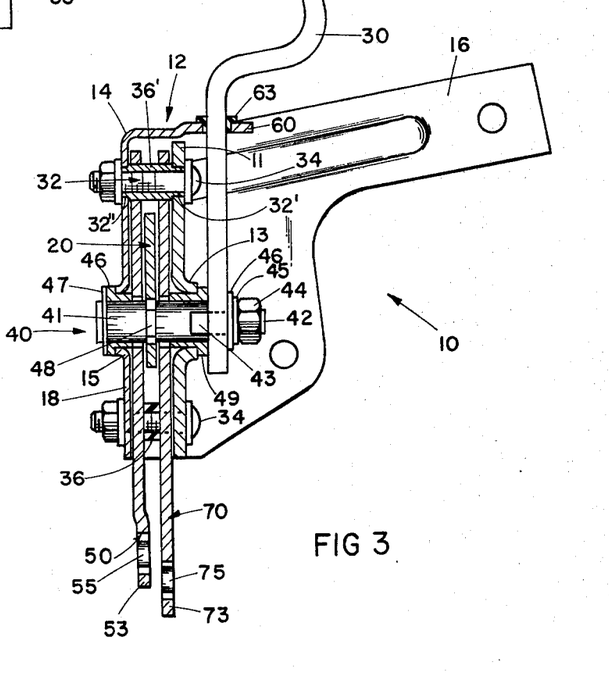
FIG. 3 is a cross sectional view taken generally along the plane III-III of FIG. 2.

Referring now to the drawings and, in particular to FIGS. 1, 2 and 3, the simplified shifting assembly of the present invention generally designated by the numeral 10 includes a housing 12, a selector arm assembly including a pivotally mounted selector arm 30, a cam slot plate 20 and a pair of pivotally mounted shifting lever arms 50 and 70. Lever arm 50 is a gear range shift arm arranged for pivotal movement through three positions about a pivot pin or shaft 32 to shift the transfer case gearing from a neutral position in a first direction to a high gear range position and in the opposite direction from neutral to a low gear range position. Differential shift lever arm 70 is pivoted about pivot shaft 32 to move the transfer case mechanisms between differential locked and unlocked or operative position in either high or low gear range as selected by lever arm 50. The selector arm assembly also includes a shaft 40 upon which is fixed the plate 20. Plate 20 includes a pair of elongated camming surface slots 24 and 23 which operatively engage with cam follower members 57 and 77 located on gear range shift arm 50 and differential shift lever arm 70, respectively. As will be further explained hereinafter, movement of selector arm 30 effects movement of plate 20 to thereby cause a corresponding movement of lever arm 50 and/or 70 to shift the transfer case into one of several selected operating modes. Preferably, the axis of shaft 40 is located within an angle θ (FIG. 2) defined by lines drawn through pivot shaft 32 and camming surfaces 23 and 24 on plate 20.

Housing 12 is generally of a two-piece construction having a mounting side 11 which includes an outwardly extending flange 16 (FIG. 3) adapted for securement to the frame work or transfer case of a vehicle in the vicinity of its transmission and transfer case. A cover 18 forms the opposite wall of housing 12 and is secured thereto by bolts 34, rivets or other suitable fastening means. Bolts 34 pass through mounting side 11 and cover 18 and include spacer members or bushings 36 to hold the two portions of the housing spaced apart. The bushings have reduced diameter end portions 36a to aid in alignment of the mounting side 11 and cover 18. The cover 18 additionally includes a wall portion 14 formed about the top and sides thereof to generally seal the interior of the housing from the environment. The bolts 34 at the lowermost corners of the housing serve to hold the two housing parts together while a similar bolt 34' centrally located at the upper portion thereof also supports a bushing 36' having reduced end portions 36a' which form a shaft upon which lever arms 50 and 70 are pivotally supported. The reduced end portions 36a' are received in openings 17 and 19 provided in housing 12. Bolt 34' and bushing 36' cooperatively form pivot shaft 32 (FIGS. 2–7) about which lever arms 50 and 70 pivot.

Gear range shift arm 50 provides the shifting function from neutral between high and low gear range positions. The arm 50 is a generally elongated member having an upper end 51 through which an opening 52 is provided for mounting on bushing 36' to pivot about shaft 32. The lowermost extremity of arm 50 generally designated by the numeral 53 includes a conventional key-shaped opening 55 for connection to a linkage arm which in turn is connected to a transfer case mechanism in a manner well-known to those skilled in the art. An elongated arcuate slot 54 is generally centrally located along the width of gear range shift arm 50 to provide clearance for pivot shaft 40 to allow shifting of the lever in an arc about its pivot shaft 32 during operation. Lower extremity 53 extends as a leg from the main body portion of the arm and includes a recessed portion 58 to clear bushing 36 located at the lower left of the housing assembly when arm 50 is rotated into a low gear range position. A stud 57 forming a cam follower is fixed in the body of the lever at a point offset from and displaced downwardly from pivot opening 52. As will be further described hereinafter, cam follower 57 is adapted to extend into camming surface slot 24 in cam plate 20.

Differential shift arm 70 provides for the locking and unlocking functions of the transfer case differential mechanisms. Arm 70 is also a generally elongated member having an upper end portion 71 through which an opening 72 is provided for mounting on the bushing 36 to pivot shaft 32. The opposite or lower end 73 has a conventional key-shaped opening 75 for connection to the transfer case through suitable linking arms. An elongated arcuate slot 74 centrally located in arm 70 provides clearance about pivot shaft 40 during rotation of the lever through an arc about pivot shaft 32 while shifting between differential locked and operative positions. A notch 78 in the body of the lever at one side provides clearance for bushing 36 at the lower right-hand corner of housing 12 as the lever is shifted into the differential locked position. A stud 77 forming a cam follower similar to cam follower 57 on lever 50 is adapted for reception in and movement along cam surface 23 in cam plate 20.

The shaft 40 is positioned centrally through the housing and includes an elongated shaft portion 41 at one end and a threaded portion 42 at the other end. The threaded end portion 42 is provided with flat areas 43 for engagement with a corresponding opening 30' provided at the innermost end of selector arm 30. Selector arm 30 is fixed to shaft 41 by a flat washer 46, lock washer 45 and a nut 44. Means are provided at the upper extremity of arm 30 for conventional connection to a shifting stick (not shown). The opposite end portion 41 of shaft 40 is held from lateral movement with respect to the housing by snap ring 47. The mounting side 11 of housing 12 is formed with annular flange 13 (FIG. 3) extending outwardly while cover 18 is similarly provided with an annular outwardly extending flange 15. Bushings 49 are positioned in the walls of the housing at the flanges 13 and 15 and serve as a bearing means for pivot shaft 40. Midway along the length of pivot shaft 41, a configured key portion 48 is adapted to engage with and mount a corresponding central configured portion 22 of plate 20.

A wall 60 extending from the top of cover 18 toward mounting side 11 is provided with an elongated slot 62. When assembled, slot 62 receives selector arm 30 preventing lateral movement thereof while allowing straight line movement as the selector arm pivots about the axis of shaft 40. A liner 63 (FIG. 2) formed of Nylon or similar lubricous material is fixed in slot 62 to form a smooth surface for movement of selector arm 30.

Plate 20 forms an actuating means for moving gear range shift arm 50 and differential shift arm 70 between the selected positions. It is positioned on key portion 48 between shift arms 50 and 70 for pivotal movement about the axis of shaft 40. Actuating means 20 is operatively associated with shifting arms or levers 50 and 70 and is mounted for pivotal movement about the axis of shaft 40 parallel to the axis of shaft 32. Cooperating camming surfaces are formed in each of the shift arms 50 and 70 and in plate 20. As will be more fully described hereinafter, first cooperating camming surfaces in shift arm 50 and in plate 20 have engaging portions which, during initial movement of plate 20 to either side of a neutral position, effect movement of shift arm 50 to shift the transfer case gearing between high and low gear range position. The first camming surfaces have dwell portions which during subsequent movement of plate 20 on either side of neutral does not effect movement of arm 50 and allows engagement of a second pair of camming surfaces to operate shift arm 70. The second pair of camming surfaces are formed in plate 20 and on arm 70. The second camming surfaces have dwell portions which during initial movement of the plate 20 to either side of neutral to shift arm 50 does not effect movement of arm 70. The second pair of camming surfaces have engaging portions which, during subsequent movement of plate 20 beyond the initial movement (into high or low range position) does effect movement of the shift arm 70 to thereby lock the differential mechanisms of the transfer case. As best illustrated in FIG. 1, a pair of elongated camming surface slots 23 and 24 are formed in the body 21 of plate 20 for engagement with cam follower 57 on arm 50 and cam follower 77 on arm 70. Camming surface slot 24 includes an intermediate elongated engaging portion 28 and a pair of oppositely directed dwell portions 29 and 31. Dwell portion 31 extends inwardly and upwardly with respect to intermediate engaging portion 28 while dwell portion 29 extends outwardly and downwardly from intermediate engaging portion 28. Cam surface slot 24 receives cam follower stud 57 on gear range selector arm 50.

Cam surface slot 23 is angularly located with the plate 20 with respect to its pivot axis and includes a centrally located intermediate dwell portion 25 and oppositely directed engaging portions 26 and 27. Engaging portion 26 is disposed upwardly with respect to the intermediate dwell portion 25 while engaging portion 27 is located generally downwardly and outwardly with respect to the intermediate dwell portion 25. Cam surface slot 23 receives cam follower 77 on differential shift arm 70.

Alignment openings 66, 56, 33 and 76 provided in housing 12, gear range shift arm 50, actuator plate 20 and differential shift arm 70, respectively, accommodate an alignment pin (not shown) for positioning the arms 50 and 70 and the actuator plate 20 in a neutral position for preliminary adjustment of the shifting linkage mechanisms (not shown) connected to the transfer case when the shifter assembly is installed in a vehicle.

Referring to FIGS. 4–7, the operation of the shift assembly will be described in greater detail with reference to the simplified illustrations. Basically, the shifter is adapted to move to either of two positions on each side of the neutral position illustrated in FIG. 2. During initial movement of selector arm 30 from neutral, as the selector arm 30 is moved forward, i.e., counter-clockwise or to the left, the first position from neutral assumed by gear range shift arm 50 is the high gear range position shown in FIG. 6. Gear range shift arm 50 is moved to this initial position by the combined action of plate 20 and its camming surface slot 24 acting on cam follower stud 57 in range shift arm 50. This is accomplished by the upper portion of the wall surface 28' forming the engaging portion 28 of camming surface slot 24 acting on the uppermost part of cam follower 57. As selector arm 30 is urged to the left, there is a corresponding downward movement of the cam slot 24 and cam follower 57 thereby urging lever arm 50 to pivot about upper pivot shaft 32 and to shift the lowermost end 53 thereof to the right and into the high gear range actuating position.

Figure 7:
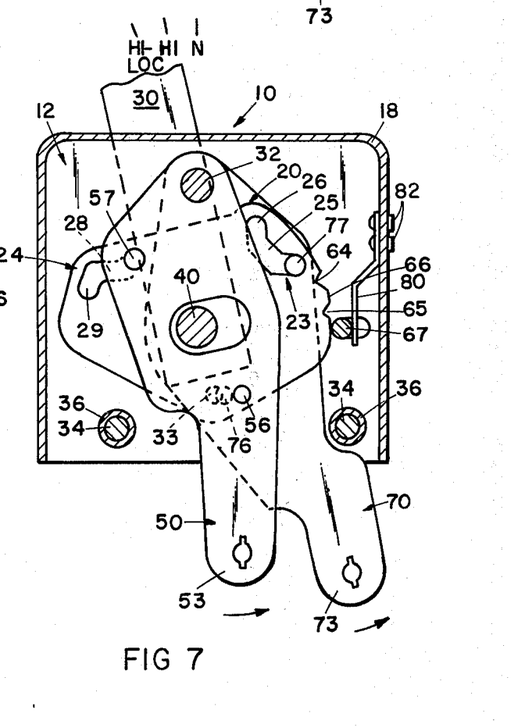
FIG. 7 is a view similar to FIGS. 4-6 illustrating the lever arms in a high gear range, differential locked position.

With reference to FIG. 7, subsequent movement of selector arm 30 serves to lock the differential when the transfer case is in the high gear range position. Subsequent movement of selector arm 30 from the initial position to the extreme left causes camming surface slot 23 in plate 30 to act on cam follower 77 on arm 70. As cam plate 20 rotates with movement of selector arm 30, cam follower 77 has freely moved through the intermediate dwell area 25 of camming surface 23. During movement of gear range shift arm 50, plate 20 is moved beyond high gear range position with movement of selector arm 30 and camming surface 27 engages cam follower 77 urging the differential shift arm 70 to pivot to the right, thereby shifting the transfer case into the differential locked position. During movement of plate 20 and differential shift arm 70 by cam follower 77, it will be noted that cam follower 57 associated with gear range shift arm 50 has effectively disengaged from plate 20 by moving into the dwell area 31 of camming surface slot 24. No additional movement of lever 50 takes place because of the provision of the dwell area 31.

Initial movement of selector arm 30 and plate 20 in the opposite direction (to the right or clockwise as viewed in the figures) serves to shift the mechanisms into the low gear range and low range, differential locked positions. In FIG. 5, cam follower 57 is again acted on by the intermediate engaging portion 28 of camming surface slot 24. At this time, the lowermost wall surface 28" (FIG. 1) of the intermediate portion 28 acts on a lower part of cam follower 57 to urge gear range shift arm 50 to pivot its lowermost portion 53 to the left. Simultaneously, dwell portion 25 of camming surface 23 freely moves about cam follower 77 on differential shift arm 70. The differential shift arm 70, therefore, at this time remains positioned in the neutral or differential operative position as shown also in FIGS. 2 and 6.

Figure 4:
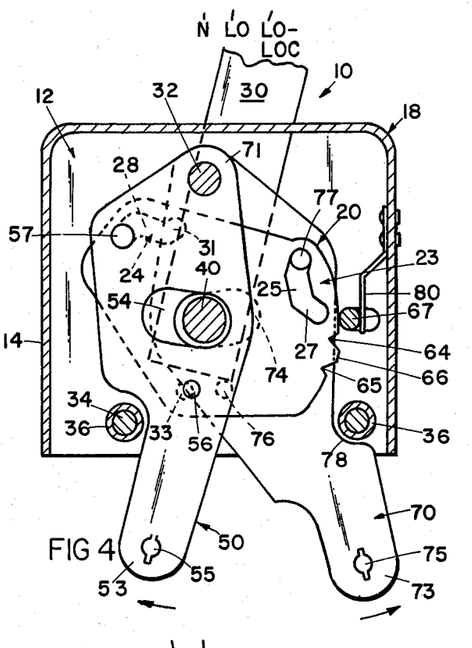
FIG. 4 is a simplified plan view illustrating the shifting levers in a low gear range, differential locked position.
Figure 5:
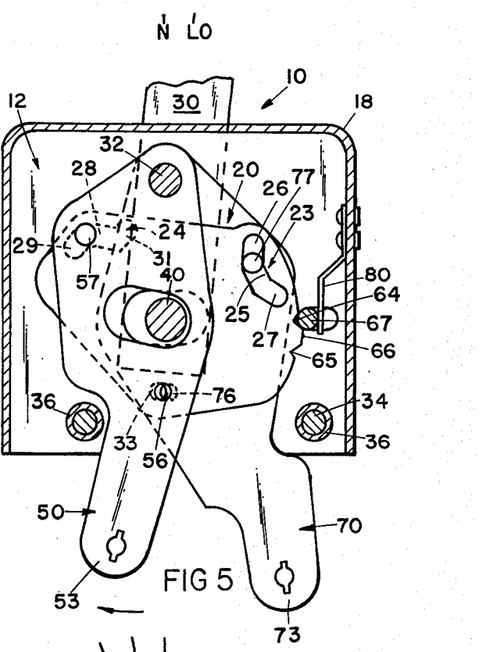
FIG. 5 is a view similar to FIG. 4 illustrating the lever arms in a low gear range, differential unlocked or operating position.
Figure 6:
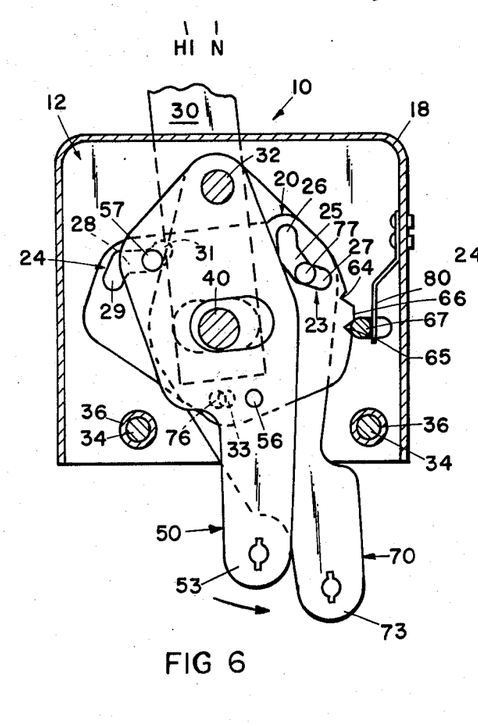
FIG. 6 is a view similar to FIGS. 4 and 5 illustrating the levers in a high gear range, differential operation position.

Referring to FIG. 4 subsequent continuous movement of the selector arm 30, clockwise or to the right, shifts the transfer case into low gear range, differential locked position. Accordingly, differential shift arm 70 must again move to the right and in a direction opposite to that of movement of gear range shift arm 50. This movement is transmitted to differential shift arm 70 by means of the uppermost engaging portion 26 of camming surface 23. As plate 20 is rotated to the right, cam follower 77 contacts the walls of engaging portion 26 urging follower 77 upwardly and outwardly as it follows the walls entering engaging portion 26 to thereby cause differential shift arm 70 to pivot about pivot shaft 32 in an arc and to the right thereby shifting the linkages connected to the transfer case into differential locking position. Simultaneously with this movement, dwell portion 29 of camming surface slot 24 moves about cam follower 57 in gear range shift arm 50 effectively disengaging arm 50 from plate 20. Returning the selector arm 30 to the neutral position causes cam followers 57 and 77 to return to the intermediate portion of their associated camming surface slots 24 and 23, respectively.

To impart a positive "feel" to the operator during operation of the shifter, a pair of detents 64 and 65 are provided on a side edge of plate 20 adjacent a sidewall of the housing (FIG. 1) Detents 64 and 65 are spaced a slight distance apart and separated by a flat or land area 66. A pin member 67 extends through housing 12 and is arranged for lateral movement toward and away from plate 20 by means of elongated transverse slots 68 and 69 in wall 11 and cover 18 of the housing. Pin 67 is biased into abutment with the side edge of plate 20 and into the detents by an elongated leaf spring 80. One end of the leaf spring is secured to a sidewall of the housing by rivets 82. The free end 84 abuts pin 67 urging it into position against the edge of the plate 20. When the assembly is in a neutral position as shown in FIG. 2, pin 67 rests on the flat area 66 between detents 64 and 65. As selector arm 30 is moved to shift the gear range shift arm 50 into low range (FIG. 5), pin 67 is biased into detent 64 thereby positively indicating to the operator that the assembly is in low gear range position. With movement in the opposite direction into high gear range (FIG. 6), pin 67 is received in detent 65. When moved into differential locking position, pin 67 rides out of the detent onto the side edge of plate 20 adjacent the respective detent. similarly, as the selector arm 30 is moved from either the high or low range differential locking position to operative and to neutral position, the pin is received in the detent thereby indicating to the operator that the transfer case is in the differential operative position.

In a preferred embodiment of the invention, movement of the selector arm is through approximately a 30° arc of rotation. The initial 6° of rotation of the selector arm from neutral will shift the transfer case into either high range or low range position depending upon the direction of rotation. At 6°, cam followers 57 and 77 enter into the respective dwell areas of cam slots 24 and 23. This dwell area lasts until approximately 8½° of rotation have been reached. Approximately in the middle of this dwell, pin 67 snaps into detent 64 or 65 depending upon the direction of rotation to hold the selector arm in position at the center of the dwell, to hold gear range shift arm 50 in its selected position and to hold differential shift arm 70 in the differential operative position. Subsequent rotation of selector arm 30 more than 8½° in either direction from neutral starts the movement of differential shift arm 70. Movement of arm 70 will be completed when the selector arm has rotated 15° either side of neutral. It will be recognized, of course, that a certain amount of overtravel is allowed to compensate for manufacturing variations in the transfer case mechanisms.

DESCRIPTION OF AN ALTERNATE EMBODIMENT

While the invention has been described with cam surface slots 23 and 24 on plate 20 associated with the cam followers 57 on gear range shift arm 50 and cam follower 77 on differential shift arm 70, the cam followers as shown on the alternate embodiment of FIGS. 8-11 may be provided on the plate and the camming surfaces arranged on the respective shift arms. Referring now to FIGS. 8-11, an alternate embodiment of the invention is described. Since this embodiment of the invention operates in basically the same manner as that previously described, only those components essential to an understanding of the invention will be described in detail. For clarity and convenience, those components similar to those previously described are identified by similar reference numerals bearing the prefix 100.

Figure 8:
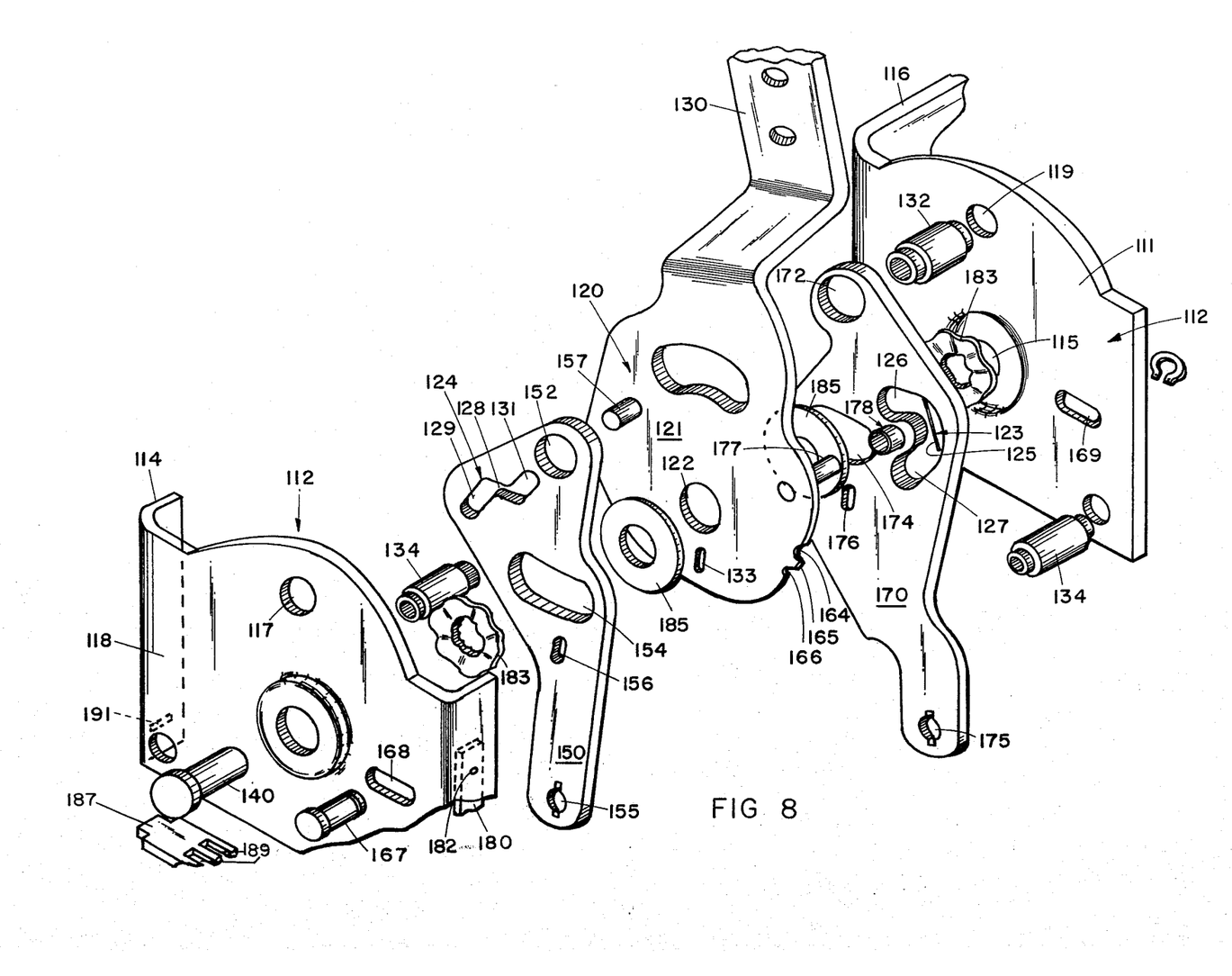
FIG. 8 is an exploded perspective view similar to FIG. 1 of an alternate embodiment of the shifting assembly.

As in the previous embodiment, the shifting assembly 110 includes a housing 112, a selector arm assembly including a pivotally mounted selector arm 130 which is integrally formed with plate 120 and a pair of pivotally mounted shifting lever arms 150 and 170. Lever arm 150 is the gear range shift arm and is arranged for pivotal movement through three positions about a pivot pin or shaft 132 to shift the transfer case gearing from a neutral position to high and low gear range positions. Differential shift lever arm 170 is also pivoted about shaft 132 to move the transfer case mechanisms between locked and unlocked positions in either high or low gear range as selected by movement of lever arm 150.

Plate 120 is integrally formed to include selector arm 130 and includes a pair of cam follower members or pins 157 and 177 adapted to engage with corresponding elongated camming slots 124 and 123 located on gear range shift arm 150 and differential shift lever arm 170, respectively. Movement of selector arm 130 effects movement of plate 120 to thereby cause a corresponding movement of lever arm 150 and/or 170 to shift the transfer case into the selected operating mode. As in the previous embodiment, the axis of shaft 140 is located within an angle $\theta$ (FIG. 10) defined by lines drawn through pivot shaft 132 and camming surfaces 123 and 124 on the lever arms 150 and 170, respectively.

Plate 120 forms the actuating mechanism for moving the gear range shift arm 150 and differential shift arm 170 between the selected positions. The plate is positioned on shaft 140 for pivotal movement thereabout. Cooperating camming surfaces are formed in each of the shift arms 150 and 170 and in plate 120. The elongated camming surface slots 124 and 123 formed in the lever arms 150 and 170, respectively, engage with cam followers 157 and 177 positioned on plate 120. Camming surface slot 124 includes an intermediate elongated engaging portion 128 and a pair of oppositely directed dwell portions 129 and 131. Dwell portion 131 extends inwardly and upwardly with respect to intermediate engaging portion 128. The opposite dwell portion 129 extends outwardly and downwardly from the intermediate engaging portion. Cam surface slot 124 receives the cam follower stud 157 on plate 120.

Cam surface slot 123 is angularly located on lever arm 170 with respect to its pivot axis and includes a centrally located intermediate dwell portion 125 and oppositely directed engaging portions 126 and 127. In contrast to the previous embodiment, the engaging portions 126 and 127 are oriented in generally the opposite direction, that is, to extend toward the center of arm 170. Engaging portion 126 faces inwardly with respect to the intermediate dwell portion 125 while engaging portion 127 is located generally downwardly and inwardly with respect to the intermediate dwell portion. Cam surface slot 123 receives cam follower assembly 177 fixed in plate 120.

Cam surface slot 123 is somewhat enlarged from that disclosed in the previous embodiment to accommodate bearing means as a bushing or roller 178 rotatably mounted on cam folower 177. Bearing 178 reduces the friction encountered between the side walls of cam slot 123 and pin 177. If desired, a similar bearing or roller may be utilized on cam follower 157 for engagement with the walls of cam surface slot 124. However, in actual practice this has not been found necessary since the movement of cam follower 157 with respect to cam surface 124 has a relatively smooth transition.

Figure 9:
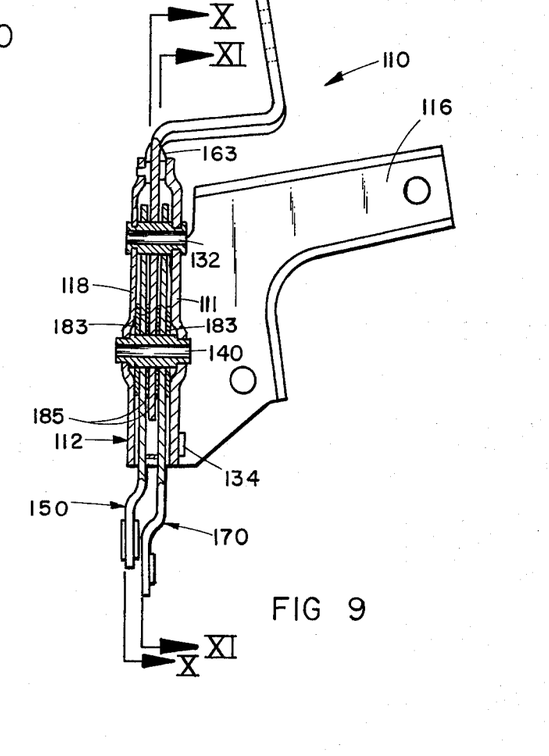
FIG. 9 is a view of the alternate embodiment similar to FIG. 3.
Figure 10:
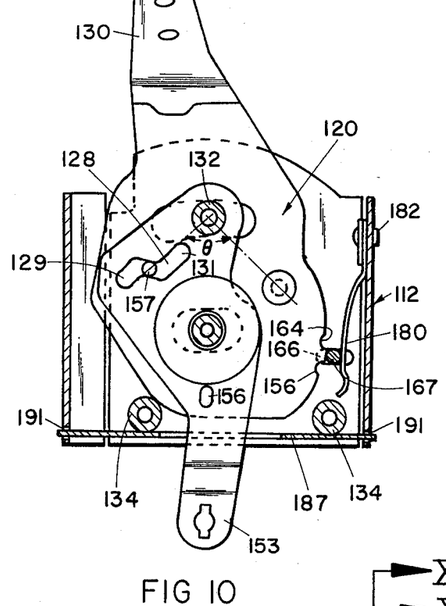
FIG. 10 is a cross sectional view taken along X—X of FIG. 9.
Figure 11:
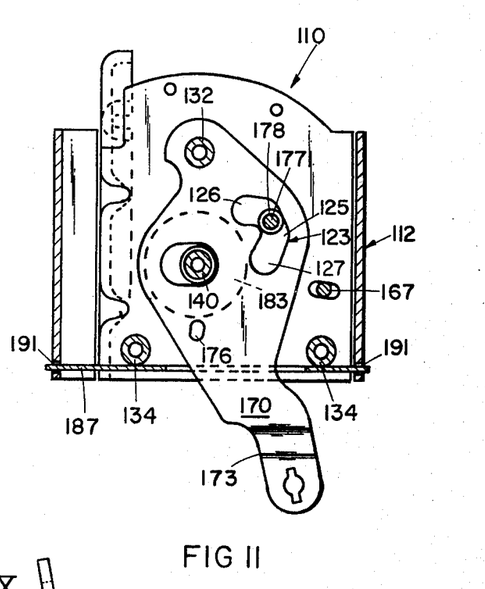
FIG. 11 is a cross sectional view taken along XI—XI of FIG. 9 with portions omitted for clarity.

Housing 112 is of a two-piece construction having a mounting side 111 which includes an outwardly extending flange 116 adapted for securement to the framework of a transfer case of a vehicle. A cover 118 forms the opposite side wall of housing 112. The two portions of the housing are secured preferably by rivets 134 or other suitable fastening means located at the lowermost corners of the housing. The upper portions of the housing are also secured together by pivot shaft 132. Shaft 132 preferably is shouldered as shown in FIG. 9 and rolled over or staked into place through suitable openings provided in the wall of the housing to thereby form a permanent assembly. Shaft 140 is similarly shouldered, extending through openings formed in the walls of the housing. A liner guide and shield 163, preferably formed of plastic-like lubricious material, is fixed at the top of the housing through which selector arm 132 extends to prevent the entrance of contaminents within the housing of the operating mechanisms and to form a smooth surface for movement of selector arm 130. A thin sheet metal dust shield 187 having slots 189 formed therein to accommodate the ends 153 and 173 of the lever arms closes the bottom of housing 112. Shield 187 is received and held in position at its ends in slots 191 formed in the side walls of cover 118.

Wave washers 183 are positioned between lever arm 150 and the inner surface of cover 118 and between lever arm 170 and mounting side 111 on shaft 140 to prevent binding and to prevent rattling of the components on shaft 140 within the housing. Additionally, a pair of thin nylon washers 185 are positioned on each side of plate 120 on shaft 140 to prevent metal to metal contact between the plate and the lever arms and to promote smooth action of the shifter.

The operation of the alternate embodiment is identical to that previously described in connection with FIGS. 4-7. It will be appreciated, however, that this embodiment is somewhat simplified when compared to the previous embodiment in that fewer component elements are required, considerably simplifying manufacture and assembly thereby reducing the overall manufacturing cost.

From the foregoing description and drawings, it may readily be seen by those skilled in the art that the present invention provides a simplified shifting assembly for transfer case gearing wherein a first shift lever arm is shiftable between a plurality of positions while a second shift arm is shifted after operation of the first to assume either one of two possible positions through the use of a novel actuating means incorporating camming surfaces and cam follower means. The apparauts of the invention provides a simplified straight-line shifter assembly and eliminates the need for complicated shifting mechanisms to shift transfer case elements. The structure of the invention is extremely low in cost since the parts thereof readily lend themselves to formation as by stamping. Those skilled in the art will readily appreciate that many advantages of the present invention over that known in the prior art and will also recognize that many modifications may be made, therefore, the equaivalent arrangements are to be included as part of this invention unless the following claims expressly state otherwise.

The embodiments of the invention in which an exclusive property or privilege is claimed are defined as follows:

1. A straight-line shifting assembly for a transfer case in a vehicle, said transfer case having a plurality of gear range drive positions and means for shifting into a selected driving mode comprising:
   a housing;
   first and second shifting levers pivotally mounted in said housing for movement in an arc about a first axis, said first shifting lever selectively shiftable between first and second positions on each side of neutral to effect shifting of transfer case gearing from a neutral position to selected high and low gear range positions;
   said second shifting lever being shiftable about said first axis from a first to a second position on each side of neutral to effect a selected driving mode of the transfer case when in one of the selected gear range positions;
   actuating means for moving said first and second shifting levers between said positions, said actuating means including a member operatively associated with said pair of shifting levers and mounted for pivotal movement about a second axis, said second axis being aligned with said first axis and positioned therebelow;
   a first pair of cooperating camming surfaces formed in each of said member and said first shifting lever, said first pair of camming surfaces having engaging portions which during initial movement of said actuating means to either side of neutral effects movement of said first lever to effect shifting of said transfer case gearing, said first pair of camming surfaces having dwell portions which during subsequent movement of said actuating means on each side of neutral does not effect movement of said first lever; a second pair of cooperating camming surfaces formed in each of said member and said second shifting lever; said second pair of camming surfaces having dwell portions which during initial movement of said actuating means to either side of neutral does not effect movement of said second lever, said second pair of camming surfaces having engaging portions which during subsequent movement of said actuating means beyond said initial movement does effect movement of said second lever; and means for rotating said actuating means about said second axis.

2. The straight line shifting assembly of claim 1 wherein said pair of camming surfaces comprise elongated cam slots formed in one of said member and said shifting levers and cam follower means formed on the other of said member and said levers.

3. The shifting assembly of claim 1 and further including biasing means operating on said actuating means, said actuating means having at least one detent provided therein, said biasing means engaging said actuator means at said detent to thereby hold said first shifting lever in one of said selected gear range positions.

4. The shifting assembly of claim 2 wherein said cam slots are formed in said member and said cam follower means are located on said shifting levers.

5. The shifting assembly of claim 4 wherein said cam follower means comprises a pair of stud members fixed on said shifting levers, said stud members extending into said cam slots for cooperative operation therewith.

6. The shifting assembly of claim 5 wherein said first axis and said second axis each extend transverse to said housing and wherein said elongated arcuate slot is provided in each of said pair of shifting levers to allow passage of said second axis therethrough.

7. The shifting assembly of claim 2 wherein at least one of said cam slots are formed in said member and at least one of said pair of said cam follower means is positioned on one of said first and said second shifting levers.

8. The shifting assembly of claim 7 and further including biasing means operating on said actuating means, said actuating means having at least one detent provided therein, said biasing means engaging said actuator means at said detent to thereby hold said first shifting lever in one of said selected gear range positions.

9. The shifting assembly of claim 2 wherein said cam slots are formed in said shifting levers and said cam follower means are located on said member.

10. The shifting assembly of claim 9 wherein said cam follower means comprises a pair of spaced stud members fixed on said member, said stud members extending into said cam slots for cooperative operation therewith.

11. The shifting assembly of claim 10 wherein said first axis and said second axis each extend transverse to said housing and wherein an elongated arcuate slot is provided in each of said pair of shifting levers to allow passage of said second axis therethrough.

12. The shifting assembly of claim 10 and further including bearing means on at least one of said stud members adapted for rolling engagement with the corresponding cooperative cam slot to minimize friction therebetween.

13. The shifting assembly of claim 2 wherein at least one of said cam slots are formed in one of said first and said second shifting levers and at least one of said pair of said cam follower means is positioned on said member.

14. The shifting assembly of claim 13 and further including biasing means operating on said actuating means, said actuating means having at least one detent provided therein, said biasing means engaging said actuator means at said detent to thereby hold said first shifting lever in one of said selected gear range positions.

15. A straight-line shifting assembly for a transfer case in a vehicle, said transfer case having a plurality of gear range drive positions and means for shifting into a selected driving mode
   a housing;
   first and second shifting levers pivotally mounted in said housing for movement in an arc about a first axis, said first shifting lever selectively shiftable between first, second and third positions to effect shifting of transfer case gearing from a neutral position to selected gear range position;
   said second shifting lever being shiftable about said first axis from a first to a second position to effect a selected driving mode of the transfer case when in one of the selected gear range positions;
   actuating means for moving said first and second shifting levers between said positions, said actuating means including a member positioned between said pair of shifting levers and mounted for pivotal movement about a second axis aligned with said first axis and positioned therebelow, a pair of elongated camming surfaces formed in one of said member and said shifting levers, one of said pair of camming surfaces having an intermediate engaging portion and a pair of oppositely directed end dwell portions, the other of said camming surfaces having an intermediate dwell portion and a pair of end-engaging portions;
   cam follower means on the other of said member and said shifting levers, said cam follower means extending into said camming surfaces; and
   means for rotating said actuating means about said second axis whereby said cam follower means is engaged by said intermediate engaging portion of one of said pair of camming surfaces to urge said first shifting lever to rotate about said second axis into one of said selected positions, said cam follower means remaining in said intermediate dwell portion of the other of said pair of camming surfaces; continued rotation of said member urging said cam follower means into said engaging end portion of said other of said pair of camming surfaces thereby urging said second shifting lever into said second position as said cam follower means moves into said end dwell portion of said one of said pair of camming surfaces.

16. The shifting assembly of claim 15 wherein said camming surfaces are formed in said actuating means and said cam follower means are located on said shifting levers.

17. The shifting assembly of claim 16 wherein said cam follower means comprises a pair of stud members fixed on said shifting levers, said stud members extending into said cam surfaces for cooperative operation therewith.

18. The shifting assembly of claim 17 and further including biasing means operating on said actuating means, said actuating means having at least one detent provided therein, said biasing means engaging said actuator means at said detent to thereby hold said first shifting lever in one of said selected gear range positions.

19. The shifting assembly of claim 15 wherein said camming surfaces are formed in said shifting levers and said cam follower means are located on said actuating means.

20. The shifting assembly of claim 19 wherein said cam follower means comprises a pair of stud members fixed on said member, said stud members extending into said camming surfaces for cooperative operation therewith.

21. The shifting assembly of claim 20 and further including bearing means on at least one of said stud members adapted for rolling engagement with the corresponding cooperative cam slot to minimize friction therebetween.

22. The shifting assembly of claim 20 and further including biasing means operating on said actuating means, said actuating means having at least one detent provided therein, said biasing means engaging said actuator means at said detent to thereby hold said first shifting lever in one of said selected gear range positions.

23. A straight-line shifting assembly for a transfer case in a vehicle, said transfer case having a plurality of gear range drive positions and means for shifting into a selected driving mode comprising:
   a housing;
   first and second shifting levers pivotally mounted in said housing for movement in an arc about a first axis, said first shifting lever selectively shiftable between first and second positions on each side of neutral to effect shifting of transfer case gearing from a neutral position to selected high and low gear range positions;
   said second shifting lever being shiftable about said first axis from a first to a second position on each side of neutral to effect a selected driving mode of the transfer case when in one of the selected gear range positions;
   actuating means for moving said first and second shifting levers between said positions, said actuating means including a member operatively associated with said pair of shifting levers and mounted for pivotal movement about a second axis,
   a first pair of cooperating camming surfaces formed in each of said member and said first shifting lever, said first pair of camming surfaces having engaging portions which during initial movement of said actuating means to either side of neutral effects movement of said first lever to effect shifting of said transfer case gearing, said first pair of camming surfaces having dwell portions which during subsequent movement of said actuating means on each side of neutral does not effect movement of said first lever; a second pair of cooperating camming surfaces formed in each of said member and said second shifting lever; said second pair of camming surfaces having dwell portions which during initial movement of said actuating means to either side of neutral does not effect movement of said second lever, said second pair of camming surfaces having engaging portions which during subsequent movement of said actuating means beyond said initial movement does effect movement of said second lever; said first and said second pair of camming surfaces formed in said member being spaced apart, said second axis being located within an angle defined by lines drawn through said first axis and said spaced camming surfaces; and means for rotating said actuating means about said second axis.

24. The straight line shifting assembly of claim 23 wherein said pair of camming surfaces comprise elongated cam slots formed in one of said member and said shifting levers and cam follower means formed on the other of said member and said levers.

25. The shifting assembly of claim 23 and further including biasing means operating on said actuating means, said actuating means having at least one detent provided therein, said biasing means engaging said actuator means at said detent to thereby hold said first shifting lever in one of said selected gear range positions.

26. The shifting assembly of claim 24 wherein said cam slots are formed in said member and said cam follower means are located on said shifting levers.

27. The shifting assembly of claim 26 wherein said cam follower means comprises a pair of stud members fixed on said shifting levers, said stud members extending into said cam slots for cooperative operation therewith.

28. The shifting assembly of claim 27 wherein said first axis and said second axis each extend transverse to said housing and wherein an elongated arcuate slot is provided in each of said pair of shifting levers to allow passage of said second axis therethrough.

29. The shifting assembly of claim 24 wherein at least one of said cam slots are formed in said member and at least one of said pair of said cam follower means is positioned on one of said first and said second shifting levers.

30. The shifting assembly of claim 24 wherein said cam slots are formed in said shifting levers and said cam follower means are located on said member.

31. The shifting assembly of claim 30 wherein said cam follower means comprises a pair of stud members fixed on said member, said stud members extending into said cam slots for cooperative operation therewith.

32. The shifting assembly of claim 31 and further including bearing means on at least one of said stud members adapted for rolling engagement with the corresponding cooperative cam slot to minimize friction therebetween.

33. The shifting assembly of claim 27 wherein said first axis and said second axis each extend transverse to said housing and wherein an elongated arcuate slot is provided in each of said pair of shifting levers to allow passage of said second axis therethrough.

* * * * *